(12) United States Patent
Traylor

(10) Patent No.: US 8,660,519 B2
(45) Date of Patent: Feb. 25, 2014

(54) APPARATUS, METHOD, AND COMPUTER PROGRAM PRODUCT FOR LOCATING A MOBILE DEVICE

(75) Inventor: Frank W. Traylor, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1303 days.

(21) Appl. No.: 11/861,761

(22) Filed: Sep. 26, 2007

(65) Prior Publication Data

US 2009/0081986 A1    Mar. 26, 2009

(51) Int. Cl.
  *H04M 11/04*      (2006.01)
(52) U.S. Cl.
  USPC .............. 455/404.2; 455/456.2; 455/567; 455/414.1; 455/418; 455/419; 455/420

(58) Field of Classification Search
  USPC ........ 455/404.2, 456.2, 567, 414.1, 418, 419, 455/420
  See application file for complete search history.

(56) References Cited

U.S. PATENT DOCUMENTS

| | | | |
|---|---|---|---|
| 6,397,088 B1 * | 5/2002 | Roo .............................. | 455/572 |
| 2004/0203697 A1 * | 10/2004 | Finn .............................. | 455/420 |
| 2005/0170853 A1 * | 8/2005 | Verma et al. ............... | 455/456.6 |
| 2009/0206993 A1 * | 8/2009 | Di Mambro et al. ........ | 340/5.84 |
| 2011/0076949 A1 * | 3/2011 | Smith .......................... | 455/41.2 |

\* cited by examiner

*Primary Examiner* — Justin Lee

(57) ABSTRACT

An apparatus, method, and computer program product are provided for permitting mobile devices to generate a location alert in response to receiving activation signals. The apparatus may receive a signal, determine if the received signal is a predefined activation signal representative of a location request, and generate an alert if the received signal is a predefined activation signal.

20 Claims, 3 Drawing Sheets

APPARATUS, METHOD, AND COMPUTER PROGRAM PRODUCT FOR LOCATING A MOBILE DEVICE

BACKGROUND

As growth in the technological sector has continued, societies have become more mobile. For example, people commonly have cellular phones, pagers, messaging devices, personal digital assistants (PDAs), pocket computers, and the like. Technological enhancements provide the ability to consolidate numerous functions onto a single device, such as email access, phone access, Internet access, games, calculator functions, calendar functions, contact lists, and alarms. Furthermore, the size of mobile devices is continuing to decrease which can increase the likelihood of misplacing or losing a mobile device. This improved functionality typically increases reliance on such mobile devices. Mobile devices of today, however, typically do not provide users with the functionality to quickly locate a lost or misplaced mobile device.

DETAILED DESCRIPTION

Figure 1:
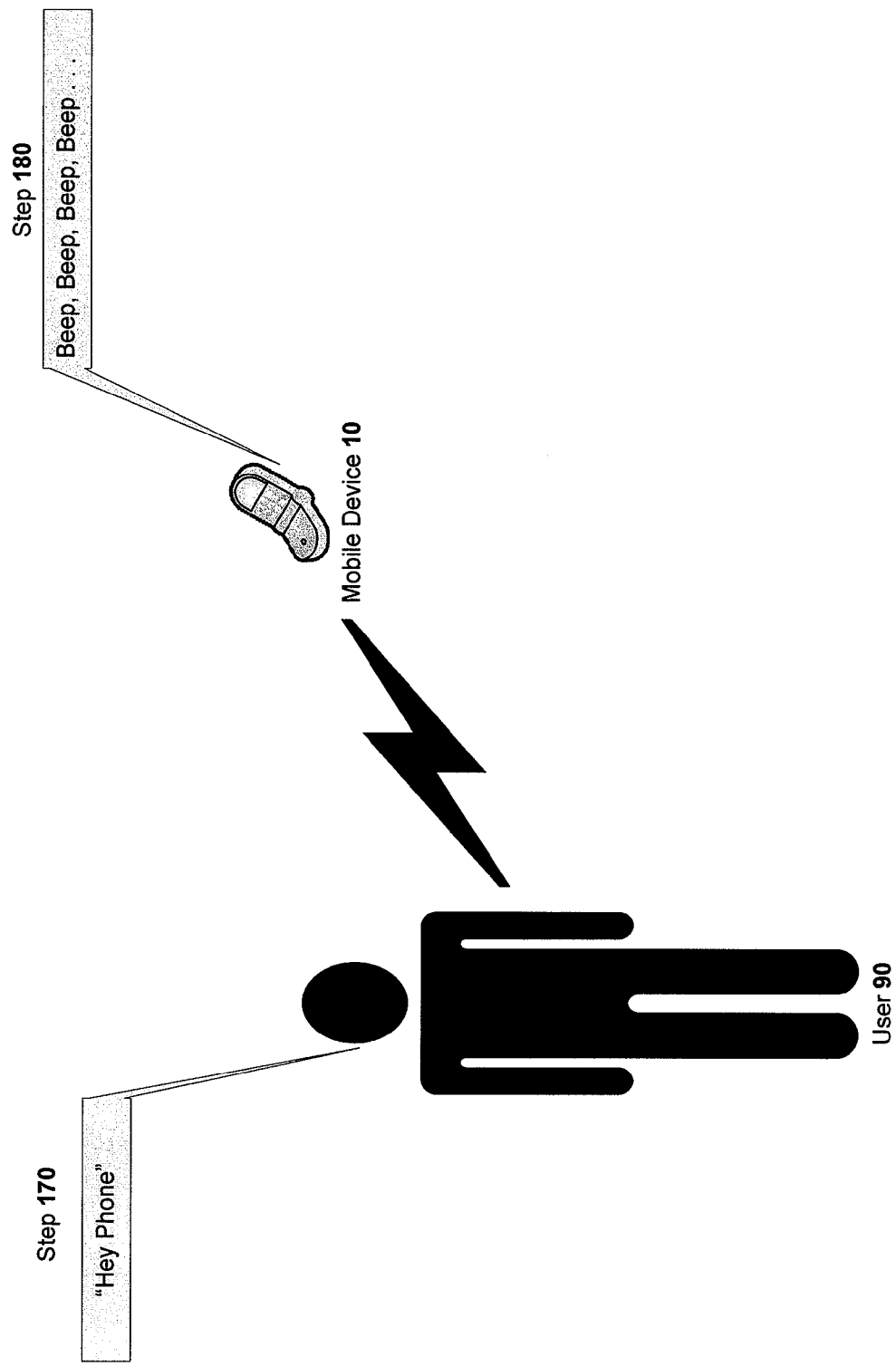
FIG. 1 shows an exemplary embodiment of a user locating a mobile device.

Exemplary embodiments are described hereinafter with reference to the accompanying drawings, in which exemplary embodiments and examples are shown. Like numbers refer to like elements throughout.

As will be appreciated, the exemplary embodiments may be implemented as a method, an apparatus, or a computer program product. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

The exemplary embodiments are described below with reference to block diagrams and flowchart illustrations of methods, apparatuses, and computer program products. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It should also be understood that each block of the block diagrams and flowchart illustrations, and combinations of blocks in the block diagrams and flowchart illustrations, can be implemented by special purpose hardware-based computer systems or other programmable data processing apparatuses that perform the specified functions or steps, or combinations of special purpose hardware and computer instructions.

Figure 3:
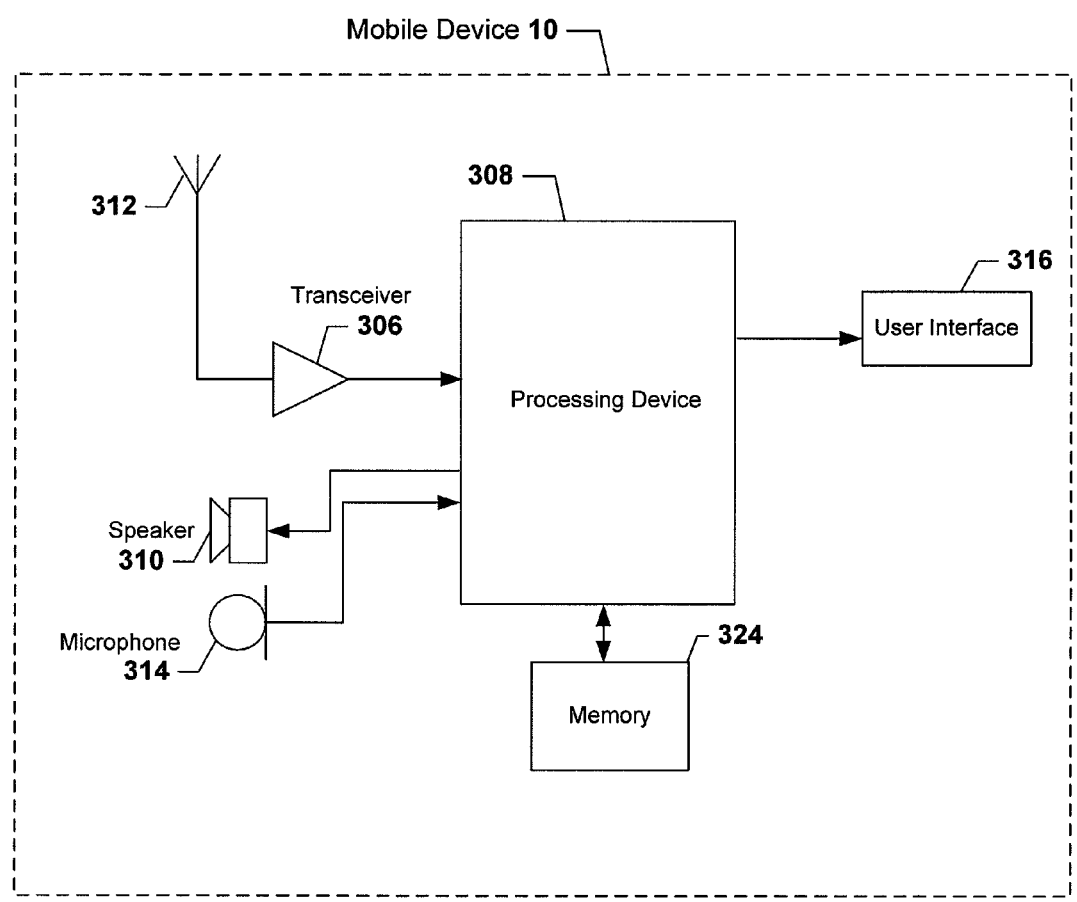
FIG. 3 shows a schematic block diagram of a mobile device capable of performing the functions described herein.

FIG. 3 shows an exemplary mobile device 10 capable of generating a location alert in response to receiving activation signals. The term "mobile device" is used generically to indicate a cellular phone, PDA, handheld device, pager, or any other mobile device configured to perform the functions described herein. The mobile device 10 typically includes a processing device 308 connected to a memory 324 for performing or controlling the various functions of the mobile device 10. The processing device 308, such as a processor, controller, or other computing device can include the circuitry required for implementing video, audio, and logic functions of the mobile device 10 and is capable of executing application programs for implementing the functionality discussed herein. The memory 324 can comprise volatile and/or non-volatile memory and typically stores content, data, or the like. For example, the memory 324 typically stores software applications, instructions or the like for the processor to perform steps associated with operation of the mobile device 10 in accordance with the various embodiments.

In addition to the memory 324, the processing device 308 can also be connected to at least one interface or other means for displaying, transmitting, or receiving data content (or the like). In this regard, the interface(s) can include at least one communication interface or other means for transmitting and/or receiving data, content, or the like. For example, as shown in FIG. 3, the communication interface can include an antenna 312 and a transceiver 306. The interface(s) may also include at least one user interface that can include a speaker 310, a display, and/or a user input interface. The user input interface 316, in turn, can comprise any of a number of devices allowing the mobile device 10 to receive data from a user 90, such as a keypad, a microphone, a touch display, a joystick, or other input device.

Figure 2:
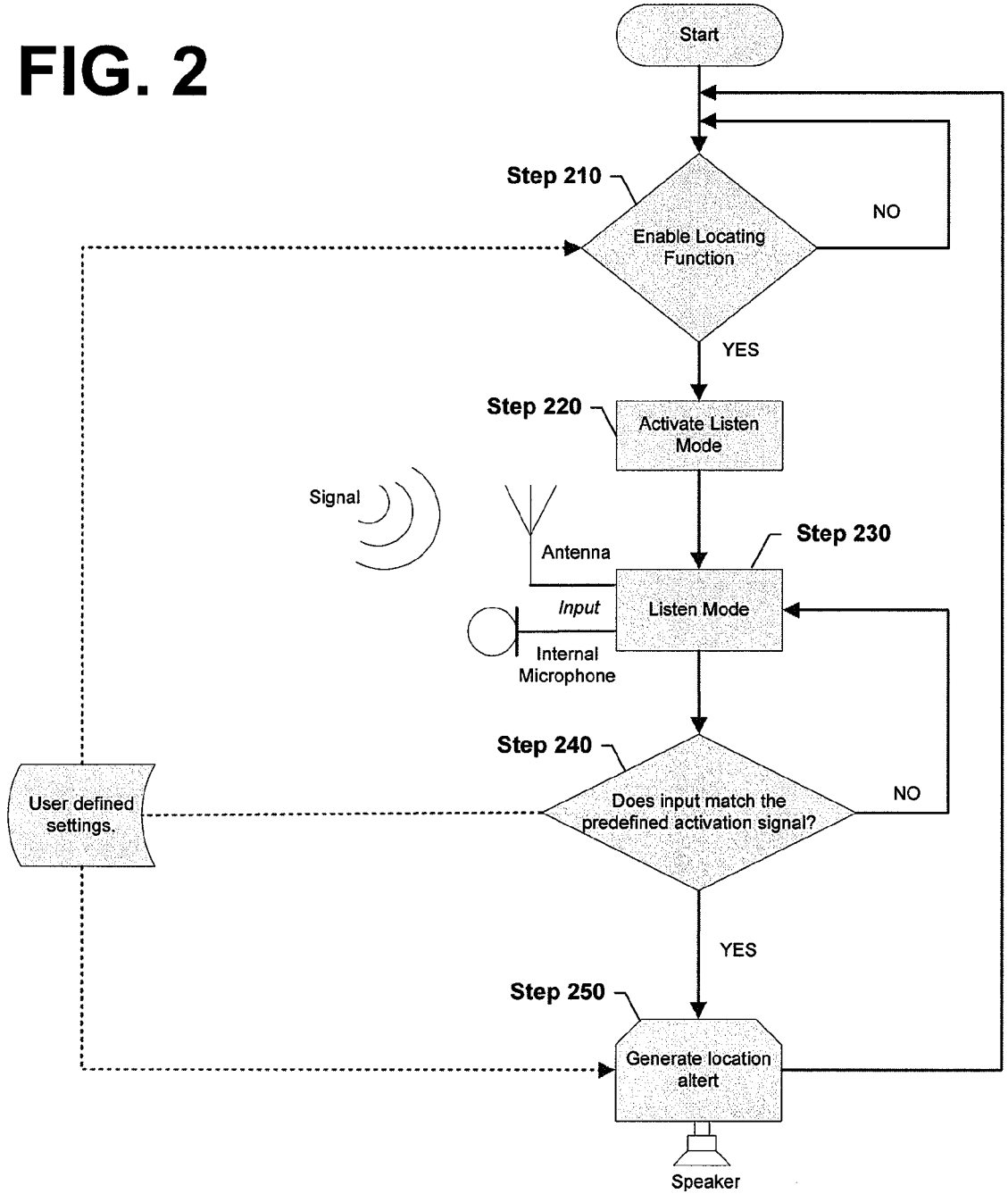
FIG. 2 shows an exemplary embodiment of a wireless device location sequence.

FIG. 2 provides an overview of exemplary steps executed by a mobile device 10 that can generate a location alert to aid a user 90 in finding a lost or misplaced mobile device 10. In this embodiment, the mobile device 10 operates in a listen mode, which activates the mobile device's 10 capability to generate a location alert in response to receiving activation signals, which form a location request. The location alert aids the user 90 in locating the mobile device 10 by vibrating, ringing, illuminating the mobile device's display, or the like.

In one embodiment, the mobile device 10 may have a menu feature for enabling and disabling the mobile device's 10 locating function, i.e., a menu feature to enable the mobile device's 10 capability to generate a location alert. To enable this functionality, the user 90 typically utilizes the user interface to navigate a menu and choose the appropriate selections to activate or enable the mobile device's 10 locating function (step 210). Similar to activating or enabling the locating function in this embodiment, the user 90 can utilize the user interface to deactivate or disable the listen mode by choosing the appropriate menu selection to disable or deactivate the locating function. In another embodiment, the mobile device's 10 locating function can be activated by merely pressing a button or key that has been pre-assigned as a shortcut to activate or enable the locating functionality. As will be recognized, the ways in which the locating function can be activated or enabled are not limiting to the various embodiments described herein.

By enabling the mobile device's 10 locating function (step 210), the mobile device's 10 listen mode is enabled or activated (step 220). That is, the mobile device 10 is enabled into a constant listen mode until the locating function is disabled or deactivated (step 210). In listen mode, the mobile device 10 receives signals, processes the received signals, and generates a location alert if the mobile device 10 determines that the received signals are predefined activation signals. In one embodiment, the mobile device 10 remains in a constant listen mode even if the mobile device 10 is powered off. Thus, for example, if the mobile device 10 is powered off, a trickle charge from the battery can supply sufficient power to the mobile device 10 for it to operate in listen mode. This allows the mobile device 10 to operate in a constant listen mode if the mobile device 10 is powered on or powered off. Similarly, the mobile device's 10 locating function can operate if the mobile device 10 is in silent mode. While a user 90 can activate the locating function at anytime, a user 90 may activate the function prior to periods of time in which the user 90 does not anticipate using the mobile device 10. Alternatively, the mobile device 10 can be configured such that the locating function is active at all times, i.e., the locating function would not require activation. As will be recognized, though, the states (e.g., powered on, powered off, or silent mode) in which the mobile device 10 operates are not limiting to the exemplary embodiments described herein and the mobile device 10 can operate in a constant listen mode while in other states.

In listen mode, the processing device 308 of the mobile device 10 receives signals via the antenna 312, microphone 314, and/or transceiver 306 and processes the signals to determine if the received signals are predefined activation signals (step 230), it determines if the signals are predefined activation signals representative of a location request. If the processing device 308 determines that the received signals are predefined activation signals, the processing device 308 can generate a location alert, such as emitting sound via the speakers 310. Predefined activation signals can be user-specific or non-user-specific. In one embodiment, the predefined activation signals used to activate the location alert of the mobile device 10 may be a clap, whistle, or the like (non-user-specific). In another embodiment, the predefined activation signals can be transmitted from an electronic source, such as by a keychain transmitter. For example, in this embodiment, a small single button locator device on a keychain can be used to transmit a predefined activation signal to activate the location alert. As mentioned, in yet another embodiment, the predefined activation signals may be user-specific, such as a specific user's voice or a phrase repeated by a specific user 90, e.g., a voice print. That is, the mobile device 10 may use voice-recognition technology to identify a specific user 90 attempting to generate a location alert. This functionality typically identifies a specific user's 90 voice and/or an activation phrase spoken by a specific user 90. Thus, the terms "signal" and "signals" are used interchangeably and are used generically to indicate a sound(s), signal(s), waveform(s), and the like.

In one embodiment, before the user 90 enables the mobile device's 10 locating function to respond to a specific user's 90 voice, the user 90 enrolls a voice print. This enrollment associates the user's 90 voice print with the mobile device 10. After enrolling the voice print, the voice print is typically converted into a digital template and stored in memory 324 for convenient access. There are numerous ways in which the voice print or predefined activation signals can be stored. In one embodiment, the voice print or predefined activation signals can be stored in a media file. The term "media file" is used generically to indicate any location or file in memory 324 storing predefined activation signals, voice prints, or the like.

The voice print is usually a biometric measurement of the user's 90 voice, i.e., a mathematical representation of the user's 90 voice. In this embodiment, the user 90 calls the mobile device's 10 phone number from the mobile device 10 to enroll the voice print. Upon calling the mobile device's 10 phone number and allowing the call to go to voice mail, an automated attendant can direct the user 90 through a series of prompts to enroll the user's 90 voice print. At this point, the user 90 may be asked to repeat a predefined expression, such as "hey phone" or "find phone" to create the voice print. Or, the user 90 can be asked to state any phrase the user 90 desires to enroll as the user's 90 voice print. In another embodiment, the user 90 can enroll a whistle or other sound as the voice print. As will be recognized, however, there are numerous other ways to enroll a voice print, such as using a provider's interactive website, calling a designated phone number that directs users through a series of prompts, or navigating the mobile device's 10 menu through a series of steps. Moreover, a single user 90 can enroll multiple voice prints to provide the functionality of generating a location alert in various ways, such as enrolling three different user-specific voice prints. Similarly, more than one user 90 can enroll a voice print with the mobile device 10 such that more than one user 90 can implement the mobile device's 10 locating function when it is set to respond to a specific user's 90 voice.

In another embodiment, the mobile device 10 can be configured to generate a location alert based on non-user-specific predefined activation signals, e.g., activation signals that are not voice prints or user-specific sounds or signals. For example, via the menu, the user 90 can select options for the mobile device 10 to generate a location alert for non-user-specific predefined activation signals, such as three successive claps, a specific tune, an activation phrase (e.g., find phone-based on the phrasing and not a specific voice), a signals received from an electronic source like a keychain transmitter, and the like. Whether the user 90 enrolls a voice print or enables non-user-specific predefined activation signals, the predefined activation signals are stored in memory 324 and used by the processing device 308 to determine whether the mobile device 10 generates a location alert. Thus, for example, FIG. 2 shows one embodiment of a mobile device 10 executing exemplary steps in listen mode.

In one embodiment, the user 90 enrolls a voice print and enables the mobile device 10 into listen mode. After receiving signals as input via the antenna 312, microphone 314, and/or transceiver 306, the processing device 308 of the mobile device 10 determines if the received signals are predefined to generate the location alert, i.e., whether they are representative of a location request. That is, the processing device 308 compares the received signals to the voice print (e.g., a user-specific predefined activation signals) stored in memory 324. If the processing device 308 matches the received signals to at least one voice print, the processing device 308 generates a location alert. In one embodiment, using biometric technology, the mobile device 10 compares the received signals to the voice print to determine if the same person is the speaker of both the received signals and the voice print (step 240). As mentioned, this is typically performed by the user 90 enrolling a specific location-request phrase, such as "hey phone" as the voice print. Thus, for instance, as shown in FIG. 1, the user 90 could say "hey phone" and, if the mobile device 10 receives the user's 90 input, the mobile device 10 would then generate a location alert after determining that the received signals match or represent the voice print (step 250).

As mentioned, though, the location alert can be configured to be activated by a whistle, clap, or any other non-user-specific predefined activation signals such as activation signals transmitted from an electronic source like a keychain transmitter. In one embodiment, for instance, the user 90 enables the mobile device's 10 locating function to respond to non-user-specific predefined activation signals, such as three successive claps. Thus, in this embodiment, after the user 90 enables the mobile device 10 into listen mode, the mobile device 10 receives signals as input. After receiving the signals as input, the processing device 308 determines if the received signals match or represent the predefined activation signals. If the processing device 308 determines that the received signals match or represent the predefined activation signals (i.e., are representative of a location request), the processing device 308 generates a location alert, such as by driving the speaker 310 to produce a predetermined sound. Thus, for instance, if the user claps three times successively and the mobile device 10 receives the sound from the three successive claps as input (e.g., a signal), the mobile device 10 would generate a location alert after determining that the received signals are the same as the predefined activation signals.

The actual location alert may vary depending on the embodiment. In one embodiment, the location alert can be changed via the mobile device's 10 menu settings. For example, the user 90 can change the location alert to generate a specific song or ring tone. Similarly, the location alert can also be set to illuminate the keyboard and/or screen on the mobile device 10 or to vibrate the mobile device 10. The location alert can be programmed for a specific duration, e.g., ring initially for thirty seconds and then ring for five seconds every five minutes thereafter or to only ring for one minute for each generated location alert. Additionally, the mobile device 10 can be set to generate a location alert until the battery reaches a certain threshold and then to only generate the location alert at specific intervals thereafter. For example, in one embodiment, the mobile device 10 can be set to ring until the battery has only 30% power remaining after which it can be set to ring for ten seconds every two minutes thereafter. Additionally, the user 90 can set the volume of the location alert as well, such as setting the volume to decrease or increase over time. As illustrated, the user can program the location alert's tone, frequency, duration, volume, and other attributes. The ways in which the mobile device's 10 location alert can be configured are not limiting the various embodiments described herein.

In the preceding specification, various embodiments have been described. It will, however, be evident that various modifications and changes may be made thereunto without departing from the broader spirit and scope of the embodiments as set forth in the claims that follow. The specification and drawings are accordingly to be regarded in an illustrative rather than in a restrictive sense.

That which is claimed:

1. A mobile device comprising:
    a memory to store a media file that includes a voice print of a voice of a user;
    a receiver to receive, directly from the user, a phrase spoken by the user; and
    a processor to:
        determine that the received phrase matches the voice print of the voice of the user,
        determine that the received phrase is an activation signal representative of a location request based on the received phrase matching the voice print of the voice of the user, and
        based on determining that the received signal is the activation signal, cause a location alert to be generated,
        when causing the location alert to be generated, the processor to:
            cause the location alert to be generated at a first interval when a battery life of the mobile device is at or above a particular percentage, and
            cause the location alert to be generated at a second interval when the battery life of the mobile device is below the particular percentage,
            the second interval being different from the first interval.

2. The mobile device of claim 1, further comprising:
    a speaker or a display to generate the location alert.

3. The mobile device of claim 1, where the received phrase comprises one or more sounds.

4. The mobile device of claim 1, where the receiver is further configured to receive the phrase when the receiver is in a listen mode.

5. The mobile device of claim 1, where the receiver is configured to receive the phrase when the mobile device is powered off.

6. The mobile device of claim 1, where the processor is further to:
    request for the user to repeat a particular expression;
    receive the repeated particular expression from the user;
    create the voice print based on the particular expression; and
    store the voice print in the media file.

7. The mobile device of claim 1,
    where the memory is further to store a voice print of another user, and
    where the processor is further to:
        receive a phrase from the other user,
        determine that the phrase from the other user matches the voice print of the other user, and
        cause the location alert to be generated based on the phrase from the other user matching the voice print of the other user.

8. A tangible, non-transitory computer-readable storage medium storing instructions, the instructions comprising:
    one or more instructions that, when executed by at least one processor of a mobile device, cause the at least one processor to:
        receive, directly from a user of the mobile device, a phrase spoken by the user;
        determine that the phrase matches a voice print of the user;

determine, based on the phrase matching the voice print of the user, that the phrase is an activation signal representative of a location request;

cause, after determining that the phrase is the activation signal, a location alert to be generated at a first interval when a battery life of the mobile device is at or above a particular percentage; and cause, after determining that the phrase is the activation signal, the location alert to be generated at a second interval when the battery life of the mobile device is below the particular percentage, the second interval being different from the first interval.

9. The non-transitory computer-readable storage medium of claim 8, where the phrase is received by the mobile device when the mobile device is enabled into a listen mode.

10. The non-transitory computer-readable storage medium of claim 8, where the phrase is received by the mobile device when the mobile device is powered off.

11. The non-transitory computer-readable storage medium of claim 10, where a trickle charge from a battery of the mobile device enables the mobile device to receive the phrase.

12. The non-transitory computer-readable storage medium of claim 8, where the phrase includes a particular word, and where the particular word is associated with the mobile device.

13. The non-transitory computer-readable storage medium of claim 8, where the instructions further comprise:

one or more instructions that, when executed by the at least one processor, cause the at least one processor to:

receive a selection, by the user, to use a particular song or a particular ring tone for the location alert.

14. A method comprising:

receiving, by a mobile device and directly from a user of the mobile device, a phrase spoken by the user;

determining, by the mobile device, that the received phrase matches a voice print of the user;

determining, by the mobile device and based on the received phrase matching the voice print of the user, that the received phrase is an activation signal representative of a location request; and generating, by the mobile device, a location alert based on determining that the received the received phrase is the activation signal, generating the location alert comprising:

generating the location alert at a first interval when a battery life of the mobile device is at or above a particular percentage, and generating the location alert at a second interval when the battery life of the mobile device is below the particular percentage, the second interval being longer than the first interval.

15. The method of claim 14, where the receiving occurs when the mobile device is in a listen mode.

16. The method of claim 14, where generating the location alert comprises generating an audible sound.

17. The method of claim 14, where generating the location alert comprises illuminating a portion of the mobile device.

18. The method of claim 14, where the receiving occurs when the mobile device is powered off.

19. The method of claim 14, where the phrase comprises one or more sounds.

20. The method of claim 14, further comprising:

receiving, via a user interface of the mobile device, a selection by the user to activate a locating function of the mobile device before receiving the phrase from the user.

* * * * *